(12) United States Patent
Pettinelli et al.

(10) Patent No.: US 6,254,003 B1
(45) Date of Patent: *Jul. 3, 2001

(54) OPTICAL READER EXPOSURE CONTROL APPARATUS COMPRISING ILLUMINATION LEVEL DETECTION CIRCUITRY

(75) Inventors: John A. Pettinelli, Rome; Dennis McEnery, Marcellus, both of NY (US)

(73) Assignee: Welch Allyn Data Collection, Inc., Skaneateles Falls, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/099,604

(22) Filed: Jun. 18, 1998

Related U.S. Application Data

(63) Continuation-in-part of application No. 08/574,386, filed on Dec. 18, 1995, now Pat. No. 5,831,254.

(51) Int. Cl.[7] ................................................ G06K 7/14
(52) U.S. Cl. ........................ 235/454; 235/455; 235/462
(58) Field of Search .......................... 235/454, 455, 235/462.06, 462.25, 462.26, 462.41

(56) References Cited

U.S. PATENT DOCUMENTS

| | | | |
|---|---|---|---|
| 4,528,444 | 7/1985 | Hara et al. | 235/462 |
| 4,538,060 | 8/1985 | Sakai et al. | 235/472 |
| 4,818,847 | 4/1989 | Hara et al. | 235/455 |
| 5,572,006 | * 11/1996 | Wang et al. | 235/454 |
| 5,811,774 | * 9/1998 | Ju et al. | 235/455 |
| 5,815,200 | * 9/1998 | Ju et al. | 348/229 |
| 5,979,763 | * 11/1999 | Wang et al. | 235/462.17 |

* cited by examiner

*Primary Examiner*—Thien M. Le
*Assistant Examiner*—J Yven
(74) *Attorney, Agent, or Firm*—Wall Marjama & Bilinski

(57) ABSTRACT

An exposure control apparatus for use with optical readers, such as bar code readers, which utilize photosensitive image sensors. An illumination signal generating circuit generates an illumination signal having a magnitude that varies in accordance with the illumination level at the image sensor. A window detecting circuit samples the illumination signal during a predetermined part of each scan to determine whether the illumination signal is within the window, has exited the window, or has re-entered the window. Exposure control circuitry uses the output of the window detecting circuit to control which of a plurality of the subdivisions of the exposure control range of the image sensor will be used. Changes in exposure time are made only between adjacent subdivisions of the exposure control range. Together with a predetermined hysteresis between the exit and re-entry thresholds of the window, the latter changes stabilize the operation of the reader by reducing exposure control "hunting".

31 Claims, 10 Drawing Sheets

OPTICAL READER EXPOSURE CONTROL APPARATUS COMPRISING ILLUMINATION LEVEL DETECTION CIRCUITRY

CROSS REFERENCES TO RELATED APPLICATIONS

The present application is a continuation in part of prior application Ser. No. 08/574,386, filed Dec. 18, 1995 now U.S. Pat. No. 5,831,254.

BACKGROUND OF THE INVENTION

The present invention relates to optical reader devices, such as bar code readers, and is directed more particularly to an optical reader having improved exposure control means.

Optical readers, such as bar code readers, have become widely accepted and used in many fields because of their proven ability to read data from optically encoded indicia, such as bar code symbols. Such readers are not only able to read optically encoded data more quickly than human beings, they are able to read it more accurately and consistently.

In spite of their widespread use and acceptance, optical readers have limitations that can prevent them from being used under all of the conditions in which their use would be desirable. One of these limitations is that the photosensitive image sensing array thereof can be so underexposed under low light conditions that the output thereof is too dark to be readily decoded. Conversely, photosensitive image sensing array can be so overexposed under bright light conditions that the output thereof is too bright to be readily decoded. This is because, under both of these conditions, the output signal of the array provides a low contrast between the white and black elements of the indicia and because such low contrast results in poor signal-to-noise ratios.

Another of these limitations is that optical readers are often restricted to operation with a depth of field that is relatively shallow. In other words, optical readers may fail to produce a readily decodable output when the distance between the reader and its target indicia is too great. This is in part because large distances between the reader and the indicia decrease the total light intensity at the indicia and thereby tend to underexpose the readers photosensitive image sensing array. This limitation is particularly troublesome in the case of readers which rely on built-in light sources, such as LEDs, rather than on ambient light levels, to provide the illumination necessary for accurate reading.

Prior to the present invention, the above-discussed limitations have been dealt with in a variety of different ways. One of these is to provide the reader with automatic gain control (AGC) circuitry for increasing or decreasing the gain or loss applied to signals produced by the photosensitive array as necessary to cause those signals to have a predetermined standardized value. One example of a reader having such AGC circuitry is described in U.S. Pat. No. 4,528,444 (Hara, et al.).

Another approach to overcoming the above-discussed limitations is to provide the reader with exposure control circuitry for increasing or decreasing the time period during which the photosensitive sensing array is exposed. Because such arrays produce outputs that are dependent on the integral of the illuminating light intensity as a function of time, changes in the exposure time of the array can be used to increase or decrease the magnitude of the output signal as necessary to cause those signals to have predetermined standardized values. An example of a reader having exposure having exposure control circuitry of this type is described in U.S. Pat. No. 4,538,060 (Sakai, et al.).

Still other approaches to overcoming the above-discussed limitations include providing illumination control circuitry for controllably increasing and decreasing the amount of light which the reader directs at the indicia to be read, and distance indicating circuitry that produces a visual distance indication that allows a user to move the reader closer to or further from the target indicia. An example of a reader having circuitry of the former type is described in U.S. Pat. No. 4,818,847 (Hara, et al.).

While the above-described approaches to exposure control improve the performance of the readers with which they are used, they all have deficiencies which limit their usefulness or cause them to make inefficient use of reader circuitry or program space. A frequently encountered one of these deficiencies is that they operate continuously, always seeking to establish a precise, optimum exposure value. Such continuous efforts are inefficient because the benefits which result from their use become insignificant as the optimum exposure value is approached. As a result, a reader can devote large amounts of time and/or program space to producing only marginal improvements in reader performance.

One way of dealing with this inefficiency is to have the exposure control function performed by special purpose hardware, thereby effectively off-loading the burden of exposure control from the readers' programmable control circuitry. This off-loading can, however, increase the cost of the reader either by increasing its parts count or by requiring the use of a sophisticated or "smart" image sensor which has a built-in exposure control function.

Another deficiency of known exposure control circuits is that they can take a long time, i.e., many scans, to reach an acceptable exposure time value. This is particularly true in readers which always use the same initial exposure value, and which converge on their final exposure value in increments that are kept small in order to avoid overshooting or oscillating about that value.

Thus, a need has existed for an exposure control circuit and method which is not subject to the above-described deficiencies.

SUMMARY OF THE INVENTION

In accordance with the present invention there is provided an improved exposure control apparatus and method which is not subject to the above-described deficiencies.

Generally speaking the present invention contemplates an exposure control apparatus and method which defines a range or window of acceptable illumination signal values, which makes no attempt to adjust the exposure time of the image sensor so long as the illumination signal is within this window of acceptability, and which makes exposure time adjustments in a manner that causes the illumination signal to fall within the window in a relatively small number of scans. In this way a reader or imaging engine using the invention can devote less of its time to exposure control activity than previously known readers or engines, and thereby have more time to spend on other reader control activities. Alternatively, the reader/engine can be constructed from simpler, less powerful and less costly electronic devices without adversely affecting its ability to successfully image an indicia under a wide variety of ambient illumination levels, and/or at a variety of different reading distances.

In the preferred embodiments, a reader/engine constructed in accordance with the invention includes a relatively simple, inexpensive image sensor which has no built-in exposure or gain control circuitry, and which exposes its photosensitive array during a time period that is started and stopped by an externally generated control signal. These embodiment also include circuitry, responsive to the output signal of the image sensor, for generating an illumination signal that varies in accordance with the intensity of the light incident on the image sensor and the exposure time thereof. Finally, these embodiments includes exposure control circuitry which detects whether the illumination signal has a magnitude that is within a range of acceptable values and, if it is not, adjusts the exposure control signals in accordance with a stored program to cause the illumination signal to enter that range in one or a relatively small number of scans. If the illumination signal is within this range of acceptable values, the reader/engine takes no action to change the then current scan rate or exposure time of the image sensor.

Advantageously, the present invention has features that allow a reader to achieve an acceptable illumination level in a relatively short time. In a first embodiment, these features comprise the use of an initial exposure time value which is selected during the time that the reader is being programmed or set-up prior to actual use, preferably by means of a menu that requests the user to identify which of a relatively small number of displayed ambient light options, such as daylight, indoors, etc., best describes the conditions that the reader will be operating under. The reader then uses the selected option to establish an initial value for a control variable that controls the exposure time of the reader. This initial selection has the effect of causing the reader to begin operation with an exposure time value that is closer to its final exposure time value than would otherwise be the case. As a result, there is a substantial reduction in the total number of exposure adjustments that will later have to be made to bring the illumination level of the reader within the window of acceptability that characterizes the actual use thereof.

In a second, simpler embodiment, the initial value of the control variable may be set as a default, and as sed a value that is associated with illumination conditions that are typical of most user applications.

Another feature that allows the reader to achieve an acceptable illumination level in a short time comprises the use of at least one stored exposure control program which is designed to reduce the number of adjustments necessary for the illumination level to enter the window of acceptability. In a first embodiment the adjusting program is arranged to periodically sample the magnitude of the illumination signal and to increment or decrement the control variable when the illumination signal is found to have fallen outside the window during a scan. The number of adjustments may also be reduced by multiplying or dividing the control variable by a constant. The program then uses the latest control variable value to fix the exposure time that will be used during the next scan.

In a second embodiment, the number of adjustments necessary for the illumination level to enter the window of acceptability is reduced by dividing the dynamic range, or range of possible exposure times, of the image sensor, into a plurality of segments or steps each of which corresponds to a particular value of exposure time or a control variable associated therewith. With this embodiment the exposure time may be reduced by causing the control variable to assume the control value which corresponds to the immediately adjacent lower exposure time segment of the dynamic range of the image sensor. Similarly, the exposure time may be increased by causing the control variable to assume the control value which corresponds to the immediately adjacent higher exposure time segment of the dynamic range. In the preferred embodiment, the number of these segments is relatively small, e.g., between five and ten, and so related to the size and characteristics of the window of acceptability that the exposure time of the image sensor is changed progressively, in a step by step manner, thereby making it less subject to the instability and hunting that can occur when changes in exposure time are made too frequently or too suddenly.

A further improvement in the stability of the preferred embodiment of the invention is provided by introducing a predetermined hysteresis into the illumination levels that define the upper and lower boundaries of the window of acceptability, and by testing whether the illumination signal is above, below or between these limits only once during each scan period, preferably at or near the middle thereof. Together these measures prevent the reader circuitry from overreacting to noise in the illumination signal, particularly when the magnitude of the illumination signal is near one of its maximum and minimum acceptable values, and thereby becoming unable to stabilize at a value that remains within the window of acceptability.

One advantageous way of achieving the above-described result is to implement the maximum illumination value at the upper or "too bright" boundary of the window by means of first and second component maximum illumination values, and to implement the minimum illumination value at the lower or "too dark" boundary of the window by means of first and second component minimum illumination values. The use of two separate values for each boundary allows one value to be used as a threshold for illumination signals that are exiting the window at that boundary and the other as a threshold for illumination signals that are re-entering the window at that boundary. The use of such separate window exit and re-entry thresholds introduces a hysteresis into the crossings of the window boundaries, and thereby prevents the exposure time of the image sensor from being changed by illumination signal noise when the illumination signal has a value near that of one of the boundaries of the window.

Testing the magnitude of the illumination signal against the boundaries of the window at only a single time during a scan period further improves the operation of the image sensor by preventing illumination signals which have large peak-to-peak values from being found to have crossed both boundaries of the window during a single scan period. The present invention is not, however, limited to embodiments in which the testing takes place during a time period that is infinitesimally short, i.e., has a substantially zero duration, or to embodiments in which this testing takes place at the middle of the scan period. This is because, in some applications, it may be advantageous for the testing to take place during or over the course of a time interval that occupies a significant fraction of the scan period, provided that this time interval is relatively small in relation to the scan period as a whole, or to occur near the beginning or end of the scan period. It will be understood that all such variants and their equivalents are within the contemplation of the present invention.

All embodiments of the present invention may include window adjusting circuitry for automatically adjusting the boundaries of the illumination window in accordance with variations in the voltage at which the image sensor operates. Such boundary adjustments are desirable because variations in the image sensor supply voltage affect the dark reference voltage of the image sensor, which in turn affects the magnitude of the illumination signal. The window adjusting circuitry takes such variations in the magnitude of the illumination signal into account by causing the maximum and minimum illumination values to increase and decrease by the same amount, thereby maintaining between the illumination signal and the illumination window a relationship which is unaffected by changes in reader supply voltage. Because of the way that the hysteresis of the invention is produced, these adjustments of the window boundaries are accomplished without affecting the relationship between the window exit and re-entry threshholds.

DESCRIPTION OF THE DRAWINGS

Other objects and advantages of the invention will be apparent from the following description and drawings, in which.

DESCRIPTION OF THE PREFERRED EMBODIMENTS

Figure 1:
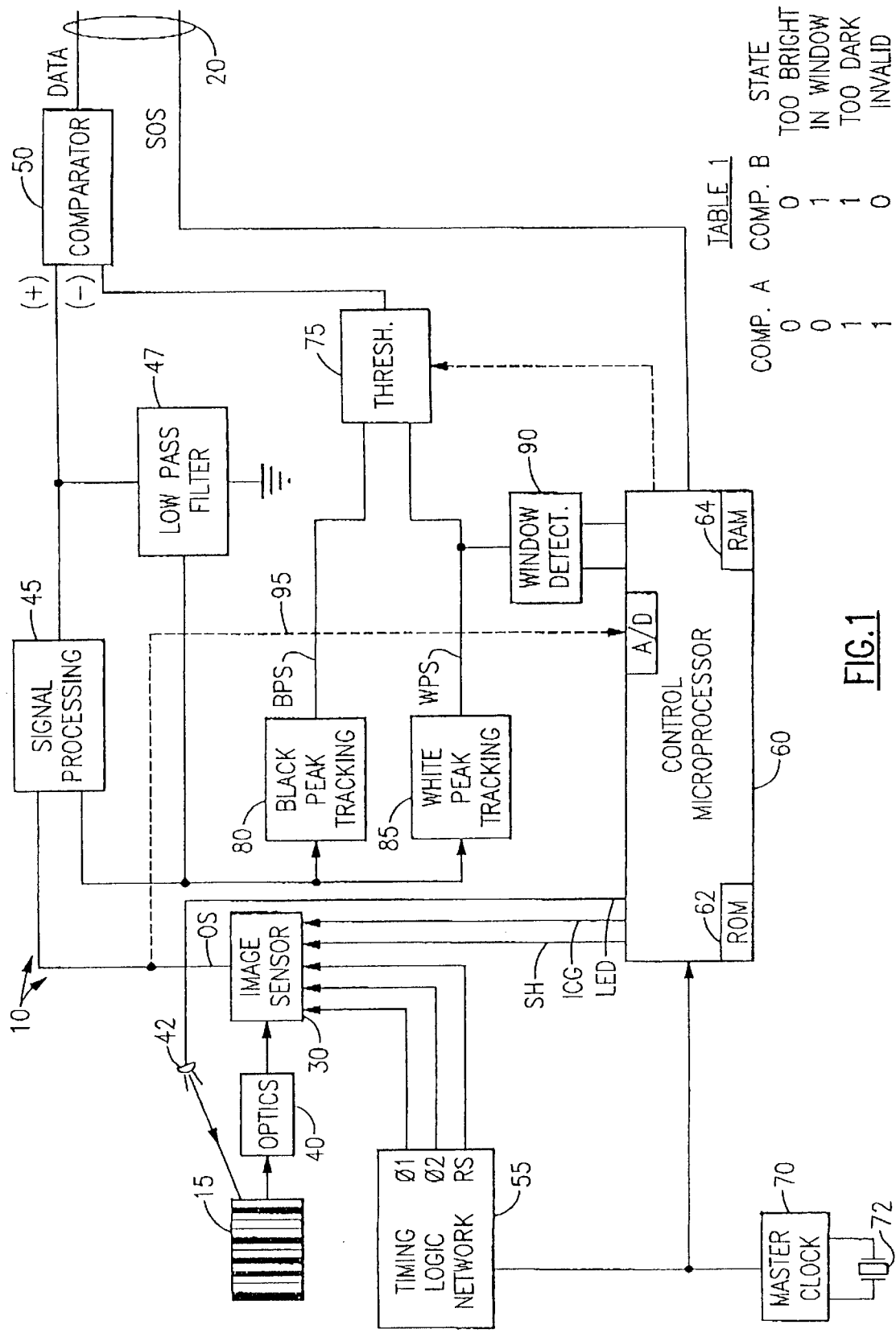
FIG. 1 is an optical-electronic block diagram of one embodiment of a reader that is suitable for use in practicing the present invention.

Referring to FIG. 1 there is shown an optical-electronic block diagram of an exemplary optical reading apparatus or device 10 that is suitable for use with the present invention. Apparatus 10 serves to optically read or scan data encoded in a target indicia 15, here shown as a one dimensional (1D) bar code symbol, and to apply to an output 20 an electrical signal which may be decoded in a known manner by any of a variety of commercially available decoder devices (not shown) to produce a usable representation of the data encoded in indicia 15. Because devices such as that shown in FIG. 1 provide decodable rather than decoded data, they are often referred to as "engines" rather than as "readers", i.e., engines that are equipped with decoders. Since the present invention is equally applicable to engines and to readers, however, this distinction is unimportant for purposes of the present description. As a result, the present description will be understood to apply both to readers and to engines, even when it uses only the more commonly used term "reader".

In FIG. 1, the reader of the invention includes an image sensor 30 of the type having a 1D array of photosensitive picture elements or pixels 32 (best shown in FIG. 3) upon which an image of bar code symbol 15 may be focused by a suitable optical assembly 40. The light forming this image will ordinarily be derived in part from ambient light and in part from a suitable light source 42 that is built into the reader and powered thereby. Image sensor 30 serves to convert this optical image into an electrical output signal OS which is further processed by a signal processing circuit 45 and a comparator 50 to produce a digital output signal labelled DATA for application to a decoder (not shown) via output 20.

The timing and control signals necessary to operate image sensor 30 are supplied thereto, in part, by a timing logic network 55 and, in part, by a programmed control device 60, which preferably comprises a microprocessor, such as a Motorola HC05, having on-chip program and data memories 62 and 64, respectively. The timing of timing logic network 55 and microprocessor 60 are controlled by a master clock 70 having an operating frequency that is, in turn, controlled by a suitable crystal 72. The manner in which image sensor 30 is controlled in accordance with these timing and control signals will be described more fully later in connection with the block diagram of FIG. 3, the timing diagram of FIG. 3A and the flow charts of FIGS. 4A, 4B, 5A and 5B.

To the end that the digital signal at output 20 may more accurately reflect the transitions of the white and black data elements of indicia 15, the reader of FIG. 1 includes a threshold voltage generating circuit 75 for controlling the threshold voltage used by comparator 50. Threshold circuit 75 serves to increase or decrease the latter voltage in accordance with the difference between black and white peak signal voltages BPS and WPS that are derived from image sensor output signal OS by black and white peak tracking circuits 80 and 85, respectively, via signal processing circuit 45 and low pass filter 47. This arrangement allows comparator 50 to reference its detection of data element transitions to a known proportion of the peak-to-peak output voltage of image sensor 30, thereby reducing the effect of instantaneous fluctuations in the ambient light level at indicia 15. Because signal processing, threshold and tracking circuits of this type are known in the art, and are included in readers that are commercially available from Welch Allyn, Inc. under the product designation ST-3400, they will not be further described herein.

Figure 3:
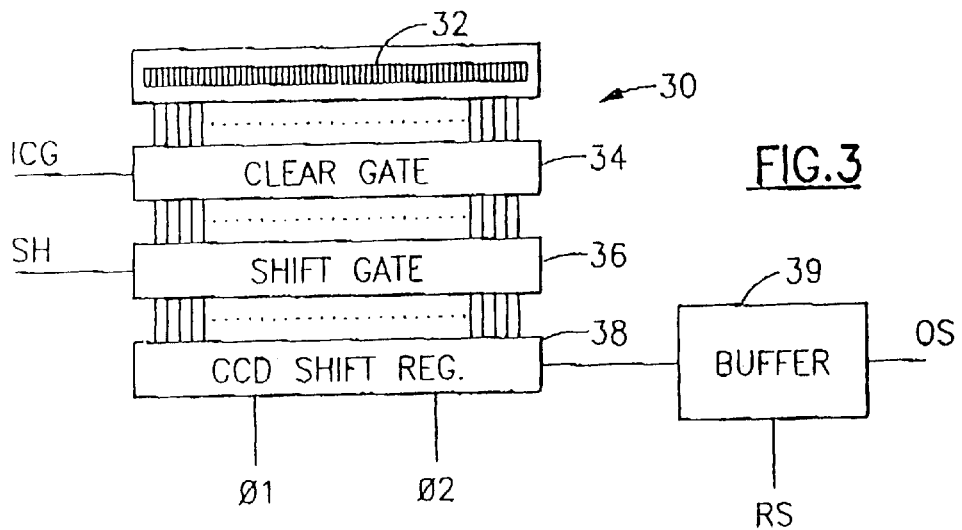
FIG. 3 is a block diagram of one image sensor of a type suitable for use with the reader of FIG. 1.
Figure 3A:
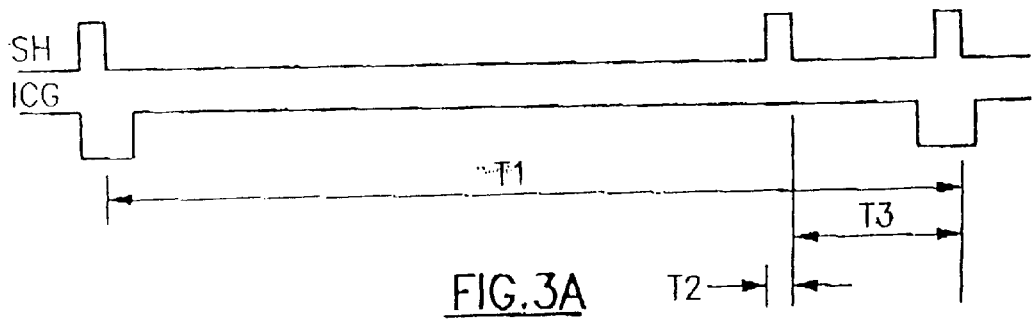
FIG. 3A is a timing diagram that illustrates the operation of the image sensor of FIG. 3.

Referring to FIG. 3, there is shown a simplified block diagram of one image sensor of a type that may be used in practicing the present invention, namely: a model TCD 1205D image sensor manufactured by Toshiba Corp. This image sensor includes a 1D photosensitive array 32 that includes 2048 pixels, a clear gate 34 which is controlled by an integration clear signal ICG, a shift gate 36 which is controlled by a shift signal SH, a CCD analog shift register 38 out of which data may be serially shifted by clock signals φ1 and φ2, and signal output buffer 39 which is controlled by a reset signal RS. Not shown, for the sake of clarity, is the internally bifurcated structure of gates 34 and 36 and register 38.

The operation of the image sensor of FIG. 3 may be summarized as follows. The scan period of sensor 30 is the time between those successive high to low transitions of shift signal SH which coincide with the low state of normally high signal ICG, as shown by time T1 in FIG. 3A. High to low transitions of shift signal SH which occur during the high state of signal ICG causes the pixels of array 32 to be cleared or "dumped", as shown during time period T2 of FIG. 3A. Together, these operations cause the image sensor to have an exposure which occupies the terminal portion of the scan period, and which is started and stopped by signals SH and ICG. Pixel data produced during the exposure time is parallel shifted from array 32 to shift register 38 when signal SH is high while signal ICG is low and signal φ1 goes high. The shifted data for each scan is then serially clocked out, via buffer 39, while the pixels of array 32 are being exposed to gather data for the next scan.

In view of the foregoing it will be seen that control signals SH and ICG together control both the exposure time and the scan period of image sensor 30. It will also be seen that, because the time necessary to shift out serial data, i.e., the data read out time, is fixed by the number of pixels and the clock frequency, there is no direct relationship between the data read out time and the scan period of sensor 30. In accordance with one feature of the present invention, these properties make it possible to vary the exposure time and scan period of the reader of the invention over a surprisingly broad dynamic range, thereby enabling the reader to read indicia over a wide range of distances, i.e., with a large depth of field.

In accordance with the invention, exposure control signals SH and ICG are generated by microprocessor 60, in accordance with a stored program that is designed to cause the output signal of image sensor 30 to assume, within the shortest possible time, a value that is within a window bounded by predetermined maximum and minimum values. Exposure control signals SH and ICG can be used in this way because both the intensity of the light incident on sensor 30 and the exposure time thereof affect the magnitude of sensor output OS. As a result, increases in exposure time can compensate for decreases in light intensity and vice-versa.

The illumination information necessary to maintain sensor output signal OS within the desired range of values may be derived therefrom either directly or indirectly. In most cases, it is preferable to derive this information indirectly. This is because indirect derivation allows the sensor output signal to be scaled, low pass filtered or otherwise processed in a way that allows the desired illumination information to be more conveniently handled. In order to reflect the variety of forms which the desired illumination information may take, the present description will use the term "illumination signal" to refer generically to any signal that varies in accordance with sensor output signal OS, without regard to whether the signal is analog or digital or whether the signal is derived from signal OS directly or indirectly.

In FIG. 1 the illumination signal comprises the output signal WPS produced by white peak tracking circuit 85. As previously explained, the latter signal has a value which varies in accordance with sensor output signal OS, but which has been processed and low pass filtered so that it reflects the time averaged maximum illumination level at sensor 30, rather than mere transient light intensity fluctuations at indicia 15. In the circuit of FIG. 1 the determination as to whether the illumination signal falls within the desired illumination window is performed by a hard-wired analog window detector circuit 90, which may comprise the comparator circuitry shown in FIG. 2. The window detecting function may also, however, be performed by an equivalent digital window detecting subroutine executed by microprocessor 60, provided that signal WPS is first converted to digital form and provided that microprocessor 60 has sufficient program memory and the time necessary to repeatedly execute such a subroutine. This digital form should be processed to extract the appropriate information for finding the time averaged value of the maximum illumination level.

Figure 2:
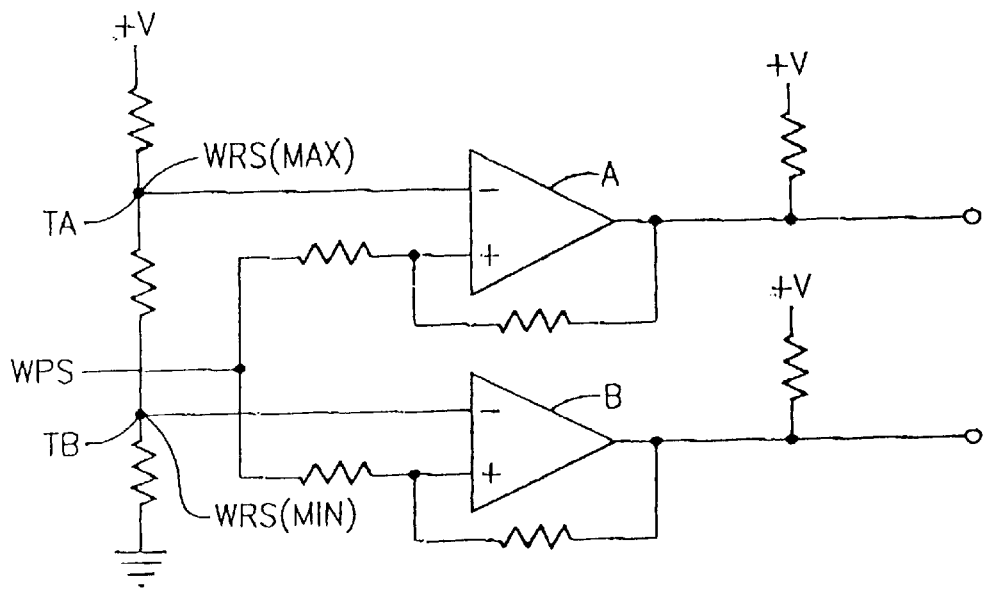
FIG. 2 is a schematic diagram of a window detector circuit suitable for use in the reader of FIG. 1.
Figure 6:
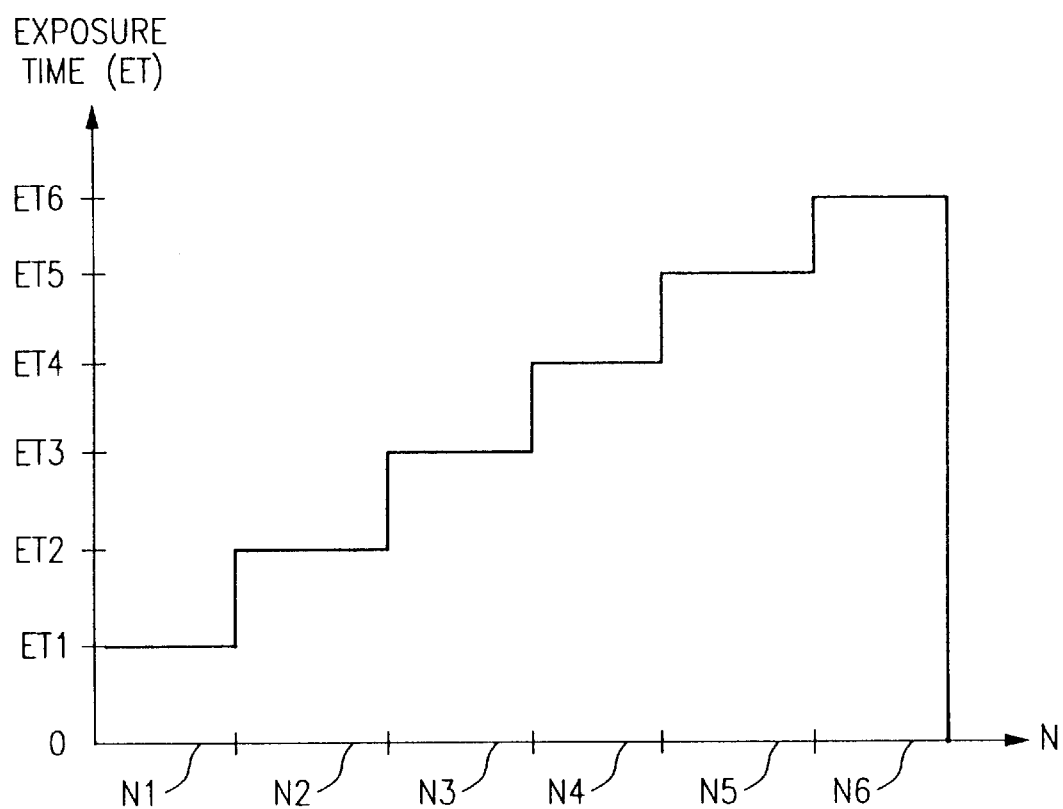
FIG. 6 shows the dynamic range of an image sensor together with the segments into which that range is subdivided.
Figure 7A:
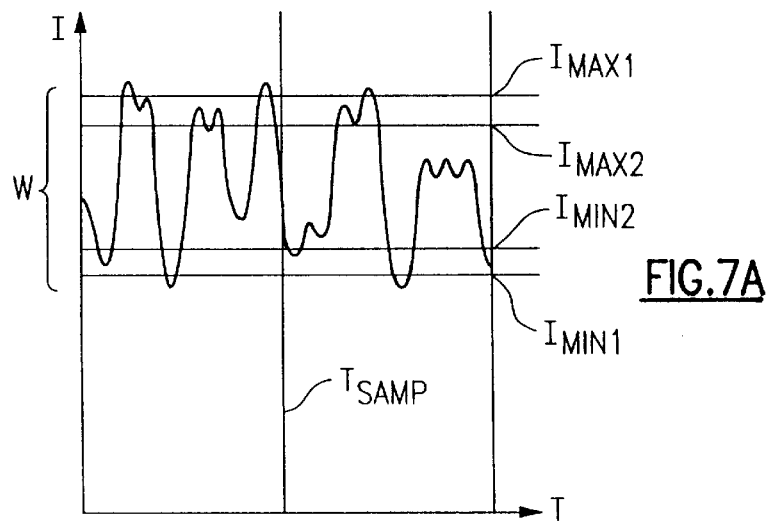
FIGS. 7A through 7C illustrate the effect of a window of acceptability of the type used with the second embodiment of the invention.
Figure 7B:
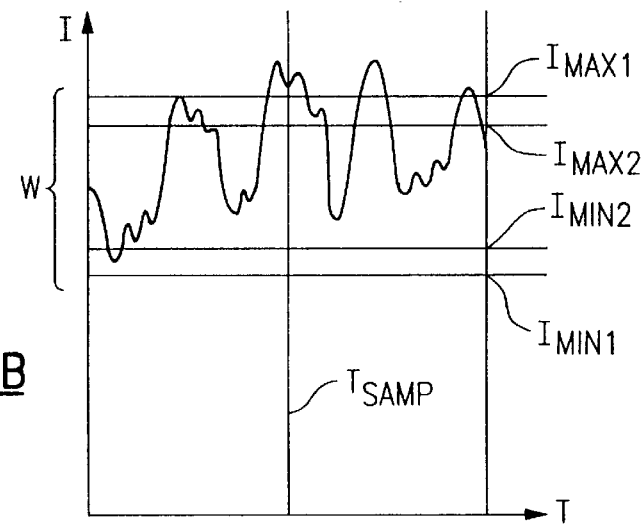
Figure 7C:
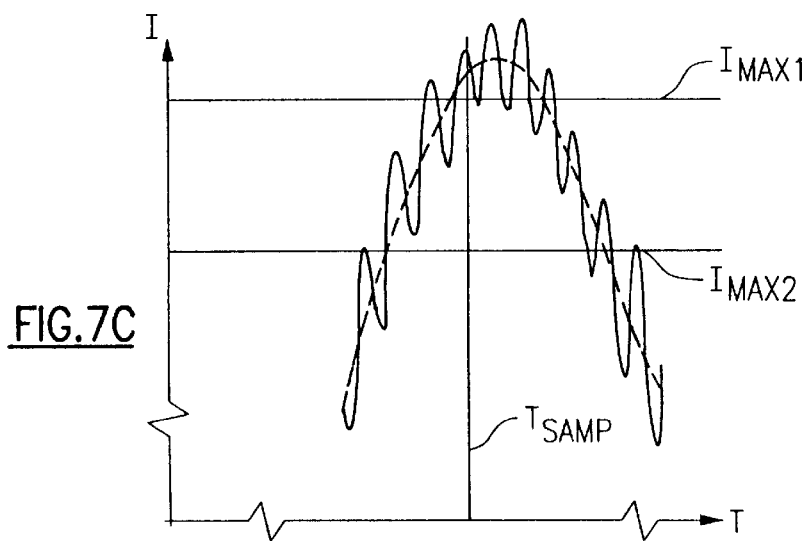
Figure 8:
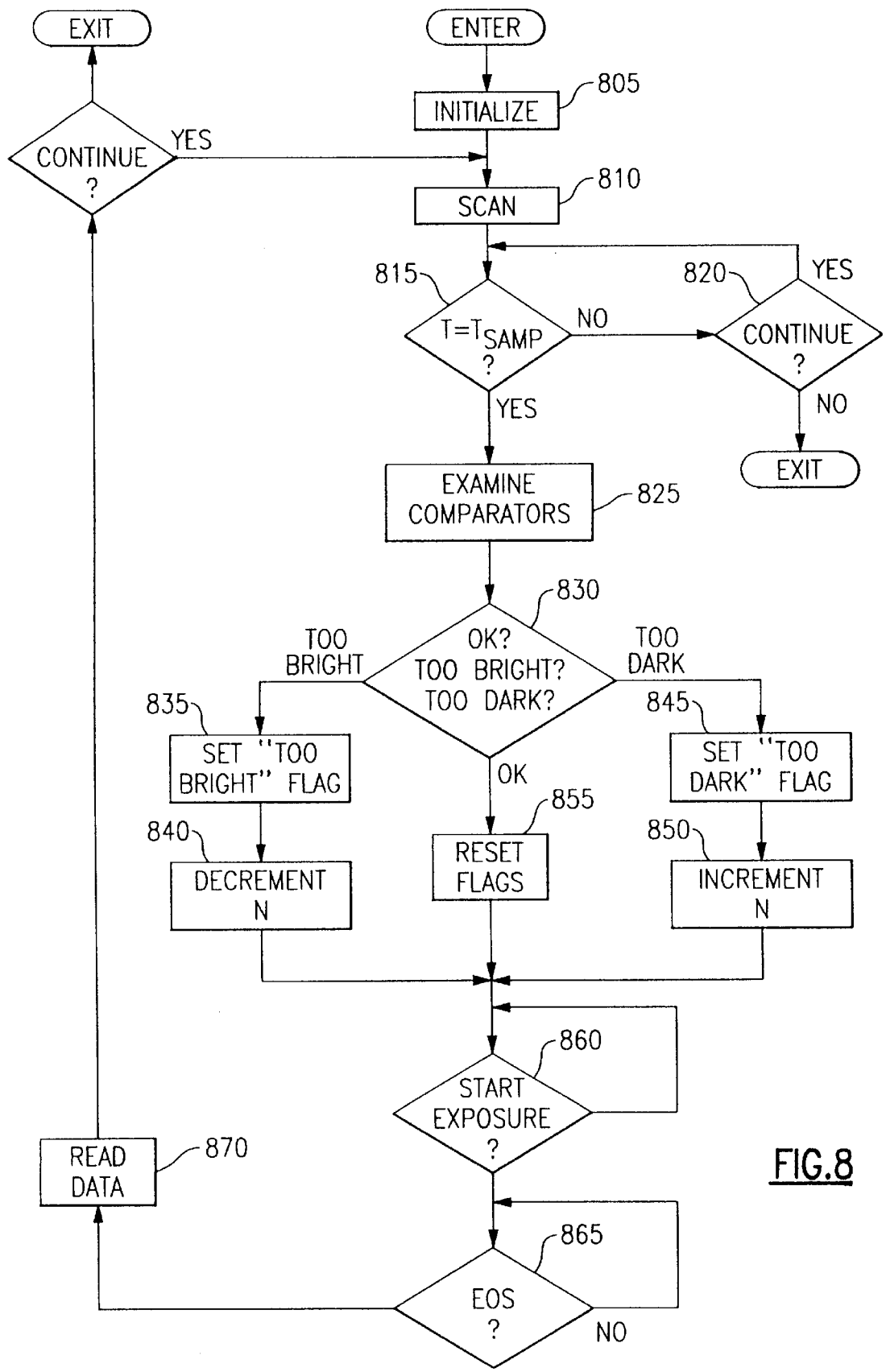
FIG. 8 is a flow chart of an exposure control program suitable for use with the second embodiment of the invention.

Referring to FIG. 2, window detector circuit 90 includes a first comparator A for determining whether white peak signal WPS has a value greater than a first DC window reference signal WRS (MAX) which is derived from a suitable voltage divider tap TA and which sets the value of the maximum acceptable value of the illumination signal. Similarly, window detector circuit 90 includes a comparator B for determining whether white peak signal WPS is less than a second DC reference window signal WRS (MIN) which is derived from a suitable voltage divider tap TB and which sets the value of the minimum acceptable value of the illumination signal. Given the connections shown in FIG. 2, the outputs of comparators A and B will produce the combinations of output states shown in Table 1. More particularly, comparators A and B will produce the combination of output states 0 and 1, respectively, only when illumination signal WPS is within the window of acceptability bounded by signals WRS (MAX) and WRS (MIN). Other combinations such as 00 and 11 indicate that the illumination signal is not within this window, i.e., is too high or too low, respectively (or cannot occur). Except as will be discussed later in connection with FIGS. 6 through 8, comparator circuits of the general type shown in FIG. 2 operate in a manner known to those skilled in the art. Accordingly, the operation of comparators A and B will not be described in detail herein.

The manner in which the illumination signal of the invention is used in a first embodiment of the invention will be described presently conjunction with the flow charts of FIGS. 4A, 4B, 5A and 5B. The manner in which the illumination signal is used in a second embodiment of the invention will be described later in connection with FIGS. 6 and 7A–7C, and the flow chart of FIG. 8.

As explained earlier, the magnitude of the illumination signal of the present invention may also be derived directly from output signal OS of image sensor 30. A first way of accomplishing this is shown in FIG. 1. In FIG. 1, determining the magnitude of the illumination signal is accomplished by connecting the output of sensor 30 directly to an I/O port of microprocessor 60, or to an A/D converter which is connected to such a port as, for example, by a conductor 95 shown in dotted lines in FIG. 1. With this embodiment, the analog output signal of sensor 30 is converted to digital form by the external A/D converter or by an A/D converter that is built into processor 60. Once converted to digital form, the illumination signal may be processed by means of a digital window detecting subroutine to produce window state signals, such as those shown in Table 1, in a manner that will be apparent to those skilled in the art. Depending upon the application, and the speed and power of microprocessor 60, this A/D conversion may be performed on each pixel of the image sensor output, each Nth pixel of the image sensor output, or selected centrally located representative pixels thereof. It will be understood that all such sampling methods are within the contemplation of the present invention.

Figure 1A:
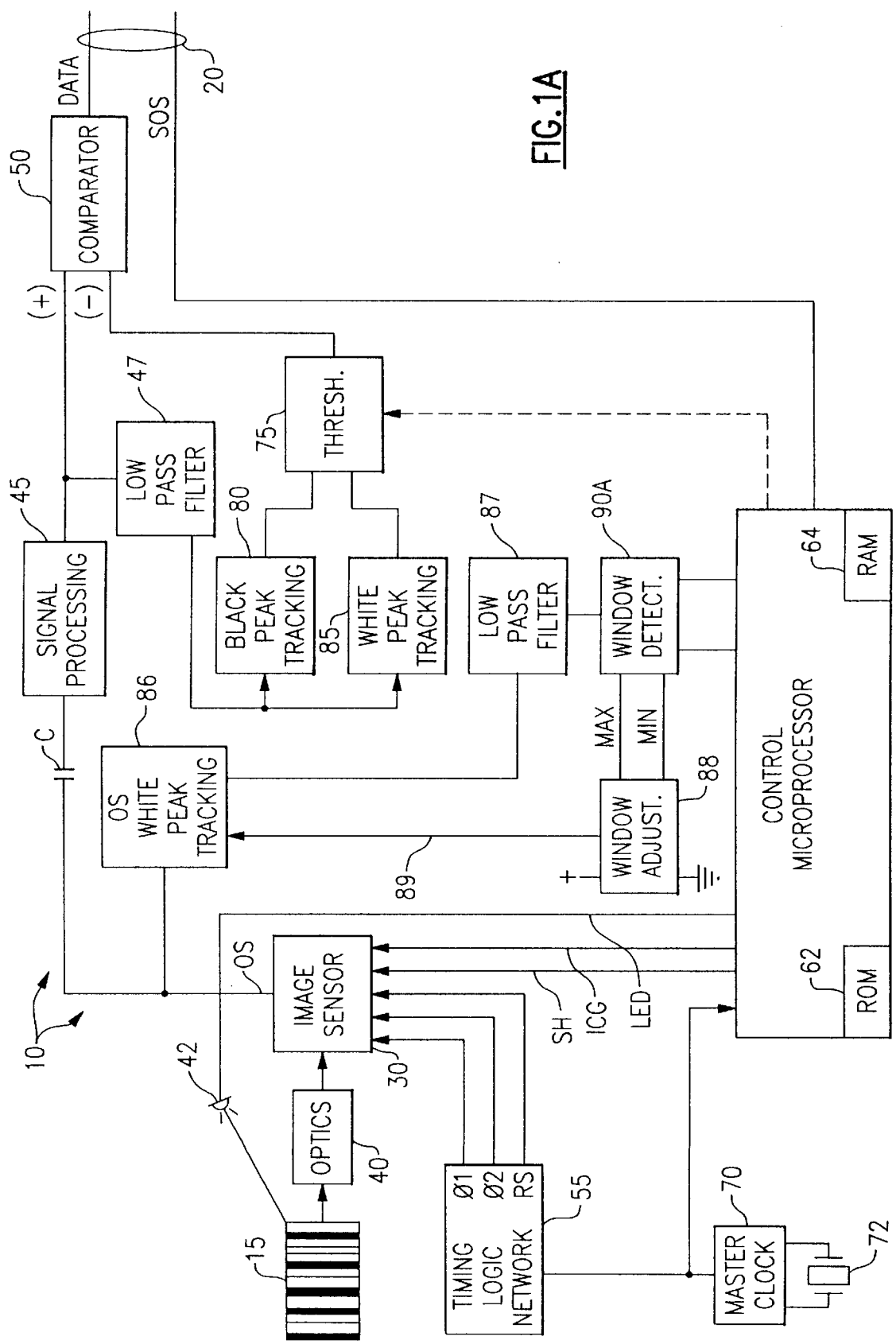
FIG. 1A is an optical-electronic block diagram of a second embodiment of a reader that is suitable for use in practicing the present invention.

A second way of deriving the illumination signal directly from output signal OS of image sensor 30 is shown in FIG. 1A. In FIG. 1A the illumination signal is produced by a dedicated white peak tracking circuit 86 which is of the same general type as previously described white peak tracking circuit 85, but which is directly coupled to the output of image sensor 30. This illumination signal is preferrably coupled to window detector 90A through a dedicated low pass filter circuit 87. One advantage of the illumination signal generating circuit of the embodiment of FIG. 1A is that it allows the design of the white peak tracking and low pass filtering which is associated with window detector 90A to be independent of and different from that which is associated with threshold circuit 75. Another is that it allows signal processing circuit 45 and associated circuitry to be AC coupled to image sensor 30 through a suitable coupling capacitor C. Other advantages of this direct derivation will be discussed later in connection with a discussion of the adjustability of the illumination window.

The First Embodiment of the Invention

The operation of the exposure control circuitry of the first embodiment of the invention will now be described with reference to the flow charts of FIGS. 4A, 4B, 5A and 5B. The exposure control process for this embodiment begins with blocks 100 and 105 of FIG. 4A, which represent one of the known set-up procedures that are used to program a reader each time that it is first turned on after having been unused for a substantial time, such as overnight. In accordance with the invention, this procedure is modified to include steps that result in the generation of a signal that provides a general indication of the overall ambient light condition under which the reader will be used. This may, for example, be done by presenting to the user a menu that includes a short list of selectable options such as: a) outdoors, b) indoors with bright lighting conditions, or c) indoors with dim lighting, etc. and by using the selected option to fix the initial value of a control variable that determines the initial exposure time for sensor 30. This may also be done, without the active participation of the user, by performing a series of exploratory scans (with light source 42 off) with exposure times that correspond to the user selectable options and selecting the option that most nearly corresponds to the result of the scan.

Once the ambient light condition has been coarsely determined, and the set-up procedure has been completed, the processor continues to blocks 110 and 115. These blocks cause the reader to use the selected ambient light condition to determine the initial value of the control variable and to set the reader to begin operation with that value.

In readers that include image sensors, such as the Toshiba 1205D, that are controlled by externally generated start-stop signals such as SH and ICG, the control variable may comprise the count, herein referred to as the "shutter count", which is set into a working counter at the start of the scan period of the sensor. This count is then decremented by a suitable shutter clock signal until, upon reaching zero, a signal is applied to the sensor to start the exposure interval. The exposure interval then continues until the end of the scan period. Accordingly, in such readers, the exposure time of the sensor will be dependent upon the duration of the scan period and the magnitude of the shutter count. Thus, the relationship between the exposure time and the control variable will be an indirect or inverse one.

The present invention may also, however, be practiced using image sensors which generate their own exposure start and stop signals based on exposure time values that are generated by circuitry external to the sensor. In readers of this type the number, count, etc. which defines or specifies the desired exposure time value comprises the control variable and may be used merely be loading it into a suitable hardware or software exposure timer. The sensor then exposes the pixel array during the period between the starting and stopping of the timer. In such readers, the relationship between the exposure time of the sensor and the control variable is a direct one.

In spite of their apparent differences, the two above-described control variable relationships are equivalent for purposes of the present invention. This is because the present invention is not dependent upon whether the control variable controls the exposure time of the sensor directly or indirectly, or upon whether the exposure interval is started and stopped by circuitry that is internal to or external to the image sensor. Accordingly, while the remainder of the flow charts of FIGS. 4A, 4B, 5A and 5B, will be discussed in terms of a control variable (shutter count) that is indirectly related to exposure time, it will be understood that, with only minor modifications of a type that will be apparent to those skilled in the art, they can be used with a reader that uses a control variable that is directly related to exposure time.

Returning to FIG. 4A, once the reader has been set to use the initial control variable value determined from blocks 100–110, the processor continues to block 120. This block causes the processor to wait for the user to request a scan by pulling the readers' trigger or, if the reader is not of the trigger actuated type, moving a target indicia into the readers' field of view. When this occurs, the processor proceeds to block 125 which causes it to wait for the actual start of a scan. As scans proceed, light source 42 will ordinarily be turned on only briefly prior to the end thereof.

Figure 4A:
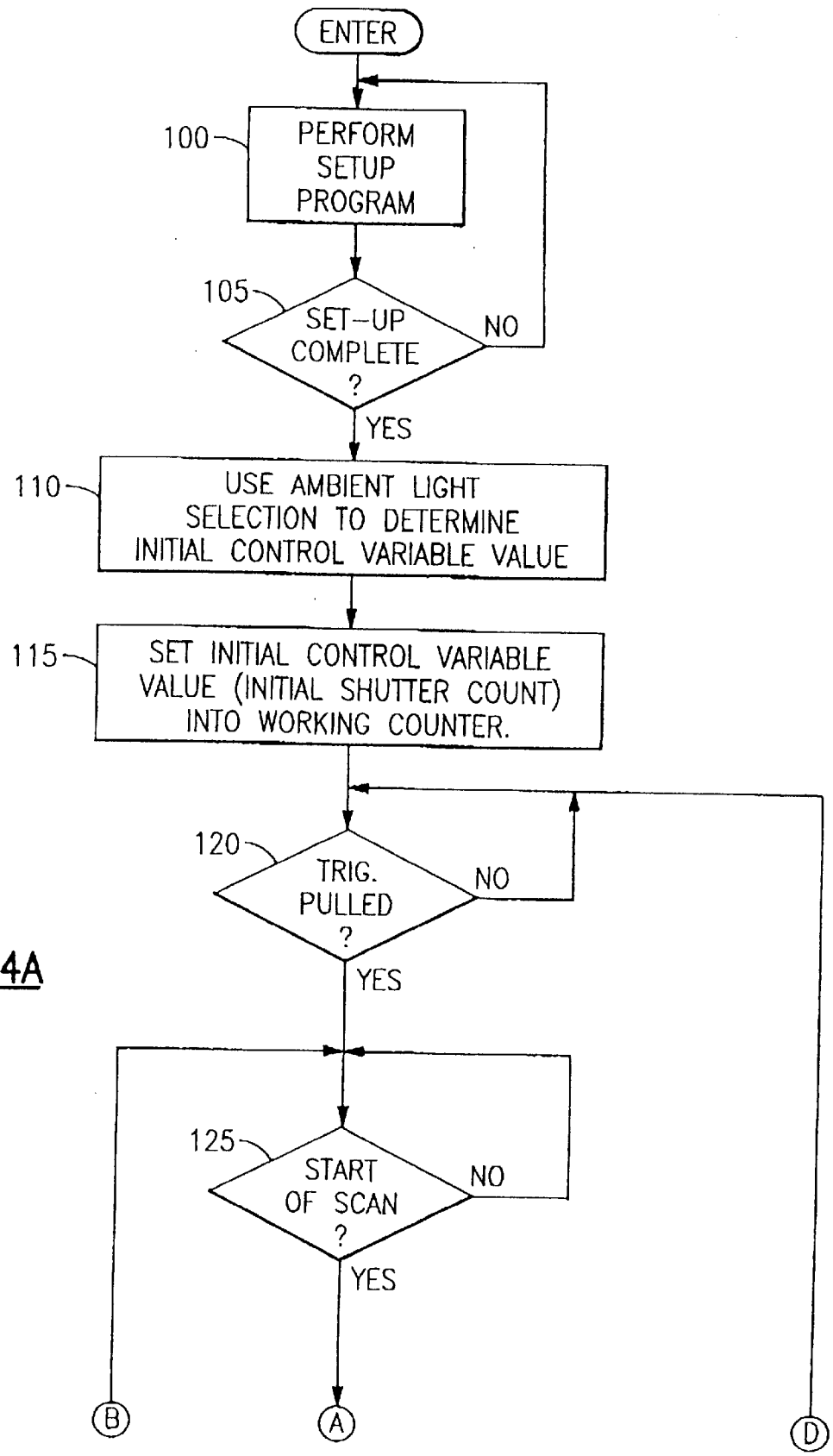
FIGS. 4A and 4B together comprise a flow chart of an exposure control program suitable for use with a first embodiment of the invention.
Figure 4B:
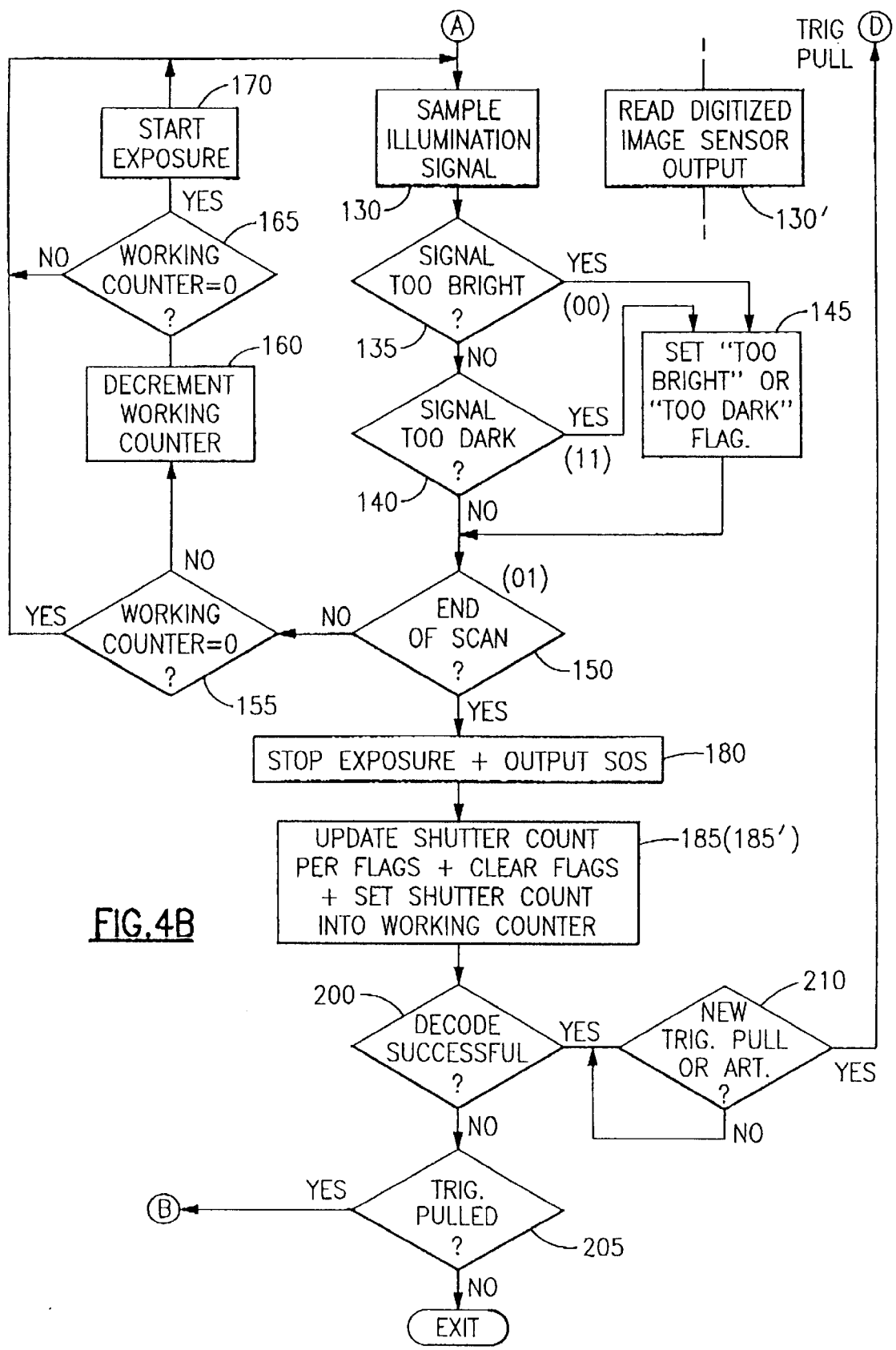

Referring to FIG. 4B, the start of a scan directs the processor to a set of blocks 130, 135, 140, 145 and 150, which together sample the illumination signal, and determine if it has a magnitude that is within a predetermined window of acceptable illumination values. These steps are accomplished by examining the outputs of window detector 90 to determine which of the states shown in Table 1 aaplies. If this examination indicates that the illumination signal is too bright (block 135), i.e., state 00 of Table 1 is detected, the reader will store that fact, as called for by block 145 as, for example, by setting a suitable "too bright" flag. Whether or not the illumination signal is too bright, the processor proceeds to block 140, which determines whether the illumination signal is too dark, i.e., whether state 11 of Table 1 is detected. If the latter state is detected, the processor will store that fact as called for by block 145 as, for example, by setting a "too dark" flag. Naturally, if the illumination signal is within the window of acceptability neither of these flags will be set. The processor then proceeds to block 150, which causes it to determine whether the scan period is over before looping back for another sample, as will be discussed more fully later.

In the event that the illumination signal is a digital signal derived directly from image sensor output signal OS, e.g., via conductor 95, block 130 may be replaced by a read block 130', and blocks 135 and 140 may be replaced by blocks (not shown) which call for digital comparisons similar to the analog comparisons performed by comparators A and B. Together, these blocks perform a window detecting function which is equivalent to that of blocks 130–145 and window detector 90. Because this alternative type of window determination is of a type well-known to those skilled in the art, it will not be described in detail herein.

In the preferred embodiment of FIG. 4B, the exposure control program is arranged so that the detection of even a single "too bright" condition during a scan will cause the control variable to be changed in a direction which decreases the exposure time used for the next scan. It is also arranged, however, so that a "too dark" condition is detected only if the illumination signal remains outside the window of acceptability during substantially an entire scan. This difference in treatment is desirable to assure that the exposure time of the reader is not flagged for an increase in exposure time merely because black data elements of the indicia causes the illumination signal to have a series of low values. It also assures that the window detection process does not result in indications that the illumination signal is both too bright and too dark. In any case, the outcome of a scan will be either the setting of a "too bright" flag or the setting of a "too dark" flag, but not both. As will be explained more fully presently, the control variable is updated, if at all, once at the end of each scan and is unchanged thereafter until the end of the next scan.

After a sample illumination signal value has been evaluated in the abovedescribed manner, the processor loops back through blocks 155 through 170 to take additional samples, unless the scan has ended per block 150. Each time it does so, it decrements the shutter count in the working counter by 1, per block 160, unless the counter has already counted down to 0, per block 155. The 0 condition of the working counter is important since it marks the start of the exposure time of sensor 30 in accordance with blocks 165 and 170. Once the 0 condition of the counter is reached, blocks 160–170 are bypassed until the next scan. The sampling process continues, however, until the processor determines per block 150 that the scan has ended. The net result of this processing is that the processor will exit block 150, at the end of a scan, with one of the out-of-window flags set, indicating that the control variable needs to be updated, adjusted, or with neither out-of-window flag set, indicating that the control variable does not need to be adjusted.

Upon exiting the above-described sampling loop at the end of a scan, the processor is directed to block 180. As this occurs, the exposure interval of the sensor is ended and signal SOS is outputted. As explained earlier, the latter signal, together with signal DATA, comprise the output of the reader at output 20.

Figure 5A:
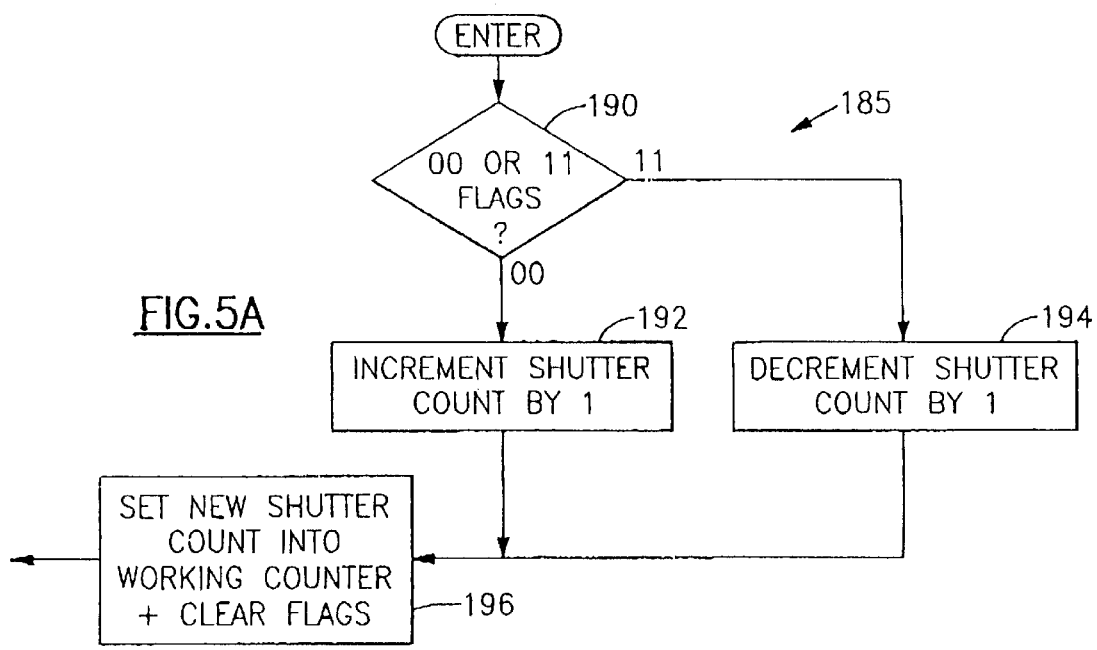
FIGS. 5A and 5B comprise alternative embodiments of exposure adjusting subroutines which may be used with the flow chart of FIGS. 4A and 4B.
Figure 5B:
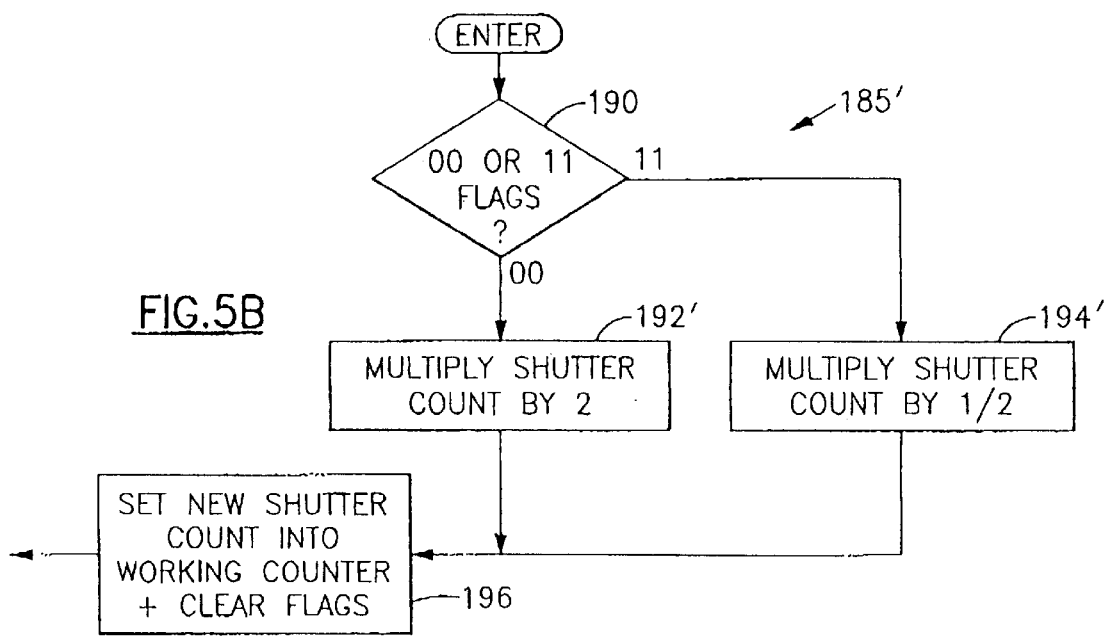

On exiting block 180, the processor enters a control variable adjusting block 185, two alternative representations of which are shown in greater detail in FIGS. 5A and 5B. Turning first to the embodiment of FIG. 5A, the processor first encounters a block 190 which directs it either to block 192 or 194, depending on whether the "too bright" or the "too dark" flag has been set. If it is the former, the stored shutter count value is incremented by 1 to reduce the exposure time by one unit; if it is the latter, the shutter count is decremented by one to increase the exposure time by one unit. In either case, the processor is directed to block 196, which causes it to set the updated shutter count into the working counter and clear the flags in preparation for the next scan.

Once the processor has exited adjusting block 185, it is in condition to begin the next scan with its new control variable value (if any) in place. Whether or not it immediately begins a new scan depends on whether the last scan produced a decodable result and, if it did, whether or not another read operation is being called for by the user. These various alternatives are processed in accordance with blocks 200–210, which direct the processor back to different points in the flow chart of FIG. 4A depending on the outcome of the scan and the intentions of the user. Because these blocks are self-explanatory, their operation will not be described in detail herein.

In view of the foregoing, it will be seen that the exposure control process illustrated in FIGS. 4A, 4B and 5A includes a window detecting step comprising a determination of whether the illumination signal is or is not within a window of acceptability and an adjusting step comprising a changing of the control variable in accordance with a stored adjustment strategy designed to minimize the number of adjustments. Because the in-window/out-of-window determination is performed largely by hardware, and because the adjustment of the control variable requires only a few rapidly executable instructions, the entire exposure control process may be executed in a relatively short time, particularly when used in conjunction with the initial control variable selection or determination that is made during the initial programming of the reader. In addition, because control variable adjustments are made only once, at the end of a scan, the exposure determination process is able to avoid the adverse effects of conditions, such as hunting, that can occur if the control variable is changed too frequently. As a result, the exposure control process of the invention will be seen to converge rapidly and monotonically on a range of acceptable values, and to do so without requiring large amounts of program memory space or execution time.

In some applications, particularly those in which the window of acceptability is relatively narrow, or in which the control variable has a relatively high resolution (e.g., a large number of bits), even the above-described exposure control process can require that numerous scans be made before the illumination signal enters the desired window. In such applications, the time necessary for the illumination signal to enter its window of acceptability may be substantially reduced by substituting the updating routine shown in FIG. 5B for that shown in FIG. 5A. This is because the updating routine 185' shown in FIG. 5B is arranged to update the control variable by the process of multiplication and division, rather than by the process of addition and subtraction, thereby greatly reducing the time necessary to make large adjustments.

More particularly, referring to FIG. 5B, the detection of a "too bright" (00) condition results in the value of the stored shutter count being multiplied by 2, as shown by block 192'. Conversely, the detection of a too dark (11) condition results in the value of the stored shutter count being multiplied by ½ (or, equivalently, divided by 2), as shown by block 194'. These multiplications are accomplished easily and quickly by shifting the contents of the stored shutter count 1 place to the left or one place to the right, respectively. Significantly, this does not result in overadjustment or underadjustment. This is because the exposure interval is initiated when the working shutter count reaches 0 (blocks 165 and 170), and because the shifting right or shifting left of the stored shutter count (blocks 192' and 194') causes the latter to change in increments that correspond to the least significant bits thereof.

In its broadest aspect, the present invention is not limited to the exemplary high speed updating routines shown in FIGS. 5A and 5B. The latter routines could, for example, be replaced by routines in which the control variable is updated on the basis of flag data or flag patterns that are stored and accumulated over a plurality of successive scans, or that vary according to any predetermined rule that can be stored in the program memory. In addition, the present invention is not limited to embodiments in which adjustments in the control variable are made at or after the end of a scan, or to embodiments in which adjustments in the control variable are made only once during a scan. It will therefore be understood that variants of all of these types are within the contemplation of the present invention.

The Second Embodiment of the Invention

As will be explained more fully presently, the invention may be also be practiced by providing the reader of FIG. 1 with an exposure control program in which the full dynamic exposure control range of the image sensor is divided into a relatively small number of discrete segments or steps, and in which transitions are made in a stepwise manner only between adjacent ones of such segments or steps. In preferred embodiments of this type, the use of this approach is coupled with the use of an illumination window, the maximum and minimum values of which each have a first switching threshold for illumination signal values that are leaving the window and a second threshold for illumination signal values that are re-entering the window, i.e., maximum and minimum values which exhibit a predetermined amount of hysteresis. Together, these features assure that necessary changes in exposure time are made quickly and in a manner that substantially eliminates the instabilities, such as hunting, that can occur when the illumination signal has a value that is near that of one of the boundaries of the illumination window.

Referring to FIG. 6, there is shown an example of an exposure control range which is divided into six discrete segments N1 through N6 which correspond to six different exposure time values ET1 through ET6, although numbers of segments larger or smaller than six could also be used. These segments may be but are not necessarily equal in size. The important thing is that they together define a range of exposure times that covers approximately the entire range of illumination conditions under which the associated reader is designed to operate. In accordance with the invention, changes in exposure time are made by incrementing the exposure time from the current value to the next adjacent higher or lower value. If, for example, the current exposure time is ET3, the exposure time may be increased to exposure time ET4 or decreased to exposure time ET2, but not increased to ET5 or decreased to ET1. Stated differently, the exposure time is controlled by controlling the value of segment number N, that serves as a control index or pointer which may be incremented or decremented in a stepwise manner, one step at a time, but which may not be changed randomly from one value to another. The stepwise or sequential nature of these adjustments provides a degree of stability that cannot be achieved by the use of exposure time look-up tables that are randomly addressed.

The exposure time adjustment process is further stabilized by controlling changes in the value of N in accordance with the relationship between the instantaneous value of an illumination signal and an illumination window which has maximum and minimum values each of which has two different switching thresholds, one for signals exiting the window and another for signals entering that window. An illumination window of this type is shown in FIGS. 7A through 7C. For the sake of clarity, the latter figures show an illumination signal that is simplified and horizontally expanded.

Referring first to FIG. 7A, the illumination window as a whole is indicated by the letter W. The maximum illumination value of this window is $I_{MAX}$ and includes a first component maximum illumination value $I_{MAX1}$ which is associated with illumination signals that are leaving window W and results in the setting of a "too bright" flag and a decrementing of N. It also includes a second component maximum illumination value $I_{MAX2}$ which is associated with illumination signals that are re-entering window W and results in the resetting of the "too bright" flag. As a result of the difference between these maximum values, an illumination condition is not regarded as too bright until the illumination signal crosses $I_{MAX1}$ and, if it does so, the "too bright" condition is regarded as continuing until the illumination signal not only re-enters window W, but also crosses $I_{MAX2}$. Similarly, the minimum illumination value of this window is $I_{MIN}$ and includes a first component minimum illumination value $I_{MIN1}$ which is associated with illumination signals that are leaving the window and results in the setting of a "too dark" flag and an incrementing of N. It also includes a second component minimum illumination value $I_{MIN2}$ which is associated with illumination signals that are re-entering window W and results in the resetting of the "too dark" flag. As a result of the difference between these values, an illumination condition is not regarded as too dark until the illumination signal crosses $I_{MIN1}$ and, if it does so, the too dark condition is regarded as continuing until the illumination signal not only re-enters the window, but also crosses $I_{MIN2}$.

The above-described double-valued window boundaries introduces into the window detection process a hysteresis which stabilizes the exposure control system as a whole by reducing its tendency to overreact to noise related changes in the magnitude of the illumination signal. The exposure control system as a whole is further stabilized by using these double-valued boundaries in conjunction with a sampling or testing process according to which the in or out of window state of the illumination signal is determined during a predetermined relatively brief portion of each scan. In the preferred embodiment this sampling takes place during a sampling interval which occurs in the middle of the scan and has a duration approximately equal to zero. This, in turn, creates a condition in which the illumination signal is sampled at substantially a single instant of time $T_{SAMP}$, as shown in FIGS. 7A through 7C.

A short duration for the sampling interval is preferred because it reduces the effect illumination signal noise, which changes much more rapidly than the illumination signal with which it is mixed. This short duration also prevents the exposure control circuitry from the ambiguities that can occur if the sampling interval is long enough to allow the illumination signal to cross both the upper and lower boundaries of the illumination window during a single scan. The location of the sampling time at the middle of a scan is preferred because it causes the sampling process to be less affected by light intensity variations that occur as a function of the distance between a point in an image and the optical axis of the system that illuminates and images it, the so-called cosine-4th effect. In spite of the fact that these durations and locations for the sampling interval are preferred, it will be understood that the present invention is not limited to exposure control circuits which use a sampling interval having a duration approximately equal to zero or occurring at any particular time during a scan period.

In some applications, it may be desirable to determine whether the exposure time of an image sensor is or is not within acceptable limits without using the illumination window of the invention with the instantaneous value of the illumination signal. This is because that instantaneous value may change so rapidly that stability is difficult to achieve. In such cases, the desired stability may be achieved by using, not the instantaneous value of the illumination signal, but rather by using a time averaged value thereof. Such time averaged values may be the cumulative average over part or all of a scan, running averages of various kinds, and weighted averages, among others. If such averages are used, the duration of the sampling interval may be increased accordingly since a time averaged signal cannot change rapidly enough to introduce ambiguities or instabilities when used with such longer duration sampling intervals. It will therefore be understood that the invention is not limited to the use of sampling intervals having infinitesimally short durations or to illumination signals that are instantaneously variable quantities.

Referring to FIG. 7A, there is shown an illumination signal having a magnitude that is neither increasing nor decreasing with time and has a magnitude that bears an overall acceptable relationship to illumination window W with pointer N pointing to a particular exposure time value. Since no excursions of the illumination signal outside the window coincide with time $T_{SAMP}$, there are no changes in N and therefore no changes in the exposure time of the image sensor during the illustrated scan. Even though from time to time, by chance, there will be scans in which $T_{SAMP}$ coincides with an out of window excursion of the illumination signal and results in the incrementing or decrementing of pointer N, these incrementings and decrementings tend to cancel out, also by chance, as scan follows scan. This is because, as previously stated, the illumination signal of FIG. 7A bears an overall acceptable relationship to the illumination window, and because changes in the value of N that are produced by the detection of random crossings of one window boundary result in over or under exposures that quickly lead to the detection of other, non-random window boundary crossings that cancel out the changes and restore N to its proper value.

Referring to FIG. 7B, there is shown an illumination signal of the type which is produced when the illumination level at the target increases with time. Because of this increase, there will eventually occur a time when $T_{SAMP}$ coincides with an illumination signal value that exceeds illumination value $I_{MAX1}$. When this occurs N will be decremented, thereby causing the next lower exposure time to be used for the current scan. This adjustment can be made during the current scan because, as explained in connection with FIG. 3A, with the TCD 1205D image sensor, the exposure time occupies the terminal portion of each scan. If this decrementing of N results in an exposure time that is appropriate to the then current illumination level, the illumination signal will stabilize as it comes to bear to the illumination window a relationship like that shown in FIG. 7A. If this decrementing of N does not result in an suitable exposure time, one or more further decrementings of N will occur as necessary during later scans until either a satisfactory exposure time is attained or the illumination level at the target changes in a way that makes further change unnecessary.

The quality of the results produced by the use of the above-described method of changing exposure time has been found to be related to the number N of segments into which the dynamic exposure control range of the image sensor is divided. This is because, if N is too large, it can take many scan periods and many incrementings of N to bring the illumination signal within acceptable limits. If the number is too small, exposure time adjustments can be so coarse that they can result in overcorrections. Accordingly, while the optimum number of segments into which the dynamic range of the image sensor is divided cannot be regarded as critical in an absolute sense, it can be regarded as critical in relation to the size of the illumination window and the difference between the illumination values at each of the window's boundaries. It will therefore be understood that it is an important feature of the present invention for the number of segments N be so related to the four illumination values making up the illumination window that an acceptable exposure time is achieved in a stable manner and in a relatively small number of scan periods.

FIG. 7C shows an enlarged view of an illumination signal just before and just after time $T_{SAMP}$, i.e. at the middle portion of a scan. In this Figure, the dotted line shows the magnitude which the illumination signal would have if it did not include noise, and the solid line shows its magnitude with noise. From this Figure it will be seen that, if the sampling of the illumination signal were not confined to a brief sampling interval, and if the upper boundary of the illumination window were not bounded by first and second component maximum illumination values that define separate window exit and re-entry thresholds, noise would cause the illumination signal to repeatedly exit and re-enter the window. Since only one of these exitings, that associated with the dotted line, represents real data, these repeated exits and re-entries are spurious, and result in an unstable condition in which the exposure time is changed back and forth between two adjacent values over the course of a series of scans, i.e., in "hunting". With the sampling interval, and with the separate window exit and re-entry thresholds of the invention, this hunting is prevented, and the circuitry operates stably in the manner described in connection with FIGS. 7A and 7B.

The desired amount of hysteresis can be produced in a variety of different ways. One of the simplest of these is to establish a suitable relationship between the feedback and input resistors, respectively, of comparators A and B of FIG. 2. If, for example, the amount of hysteresis for the upper boundary of window W is to be relatively high, then the ratio of feedback resistor $R_{FA}$ of comparator A to input resistor $R_{IA}$ thereof should be relatively low. Conversely, if the amount of hysteresis is to be relatively low, then the latter ratio should be relatively high. Similar relationships determine the amount of hysteresis for the lower boundary of window W, which hysteresis may but need not be the same as that for the upper boundary thereof. Alternatively, all of the window boundaries may be established by means of a stored digital window detecting routine which uses the A/D converted form of the image sensor output signal, as explained earlier in connection with FIG. 1. It will be understood that these and all equivalent ways of establishing the desired double-boundaried window are within the contemplation of the present invention.

The operation of the circuitry of the invention will now be described with reference to the flow chart of FIG. 8. In FIG. 8, the reading process begins when a manually or automatically initiated trigger signal (not shown) occurs, and causes the reader to initialize (block 805). As a part of this initialization, the value of N is set to its default value to establish an initial value for the exposure time of the image sensor. This value of N will ordinarily but not necessarily be a value, such as N3 or N4 of FIG. 6, from which N may be either incremented or decremented. Control then passes to block 810 which initiates a scan. As this scan proceeds, the reader cycles through blocks 815 and 820, until it is either manually or automatically discontinued by the action of block 820. As this occurs, a data interrupt routine (not shown) is activated repeatedly to process data as it becomes available. Because these steps are conventional, they will not be described in detail herein.

In accordance with the invention, the above-described reading process is interrupted by block 815 at that time during each scan which corresponds to $T_{SAMP}$. At the latter time, block 815 causes control to pass to blocks 825 and 830 which perform the illumination level determinations discussed in connection with FIGS. 7A and 7B. More particularly, blocks 825 and 830 cause the reader to examine the outputs of the comparators of window detector 90 and determine whether the illumination signal is within the window (OK), greater than maximum illumination value $I_{MAX1}$ (too high or bright) or less than minimum illumination level $I_{MIN1}$ (too low or dark). If it is greater than $I_{MAX1}$, a "too bright" flag is set (block 835) and N is decremented (block 840) to select the next lower value of exposure time. The reduced exposure time may be put into effect by changing the shutter count in the working counter discussed in connection with FIG. 4B. If the illumination signal is less than $I_{MIN1}$, a "too dark" flag is set (block 845) and N is incremented (block 850) to select the next higher value of exposure time. If the illumination signal is within the window, both flags are reset (block 855) and the value of N is not changed.

Once the adjustment of N, if any, is complete, control passes to block 860, which serves to delay the beginning of the exposure period until the working counter counts down to zero. When the latter condition occurs, the contents of the image sensor are dumped so that the new exposure begins in a known, zeroed state. As the exposure proceeds, the illumination is turned on at the appropriate time before the end of the scan via an interrupt routine not shown. The exposure then continues until the end of the scan (block 865), when data is read (block 870) and a determination made as to whether scanning is to continue (block 875). The reader then either begins a new scan or stops scanning at this time.

Because changes in N that are made during the course of a scan occur at about the middle of a scan, they increase the exposure time of that scan only if the new value of N corresponds to an exposure time that is less than one half of a scan period. As a result, values of N that correspond to longer exposure times will not take full effect until the following scan. Although this situation results in some scans being unusable or "lost", the loss of such scans have been found to not affect the overall performance of the reader significantly enough to justify the design changes that would be necessary to eliminate that loss.

In the preferred embodiment the flags are set via block 835 or 845 as the illumination signal exits window W, and are reset via block 860 as the illumination signal re-enters window W. The setting and resetting of the flags via blocks that are in different, separate paths through the flow chart of FIG. 8 is advantageous because it provides a convenient way of allowing the apparatus of the invention to establish the desired hysteresis. Since the paths (blocks 835 or 845) that set the "too bright" and "too dark" flags, are separate from the path (block 855) that resets these flags, these flags should be arranged so that their states do not toggle as successive signals of the same type are applied thereto. Arranging the flags in this way has the advantage that it speeds up the reaching of a stable exposure condition under those circumstances where N must be incremented or decremented in the same direction two or more times in succession.

While the above-described flag control circuitry operates well, it has a number of variants that may be advantageous, depending on the particular application. The incrementing and decrementing of N, for example, need not be made during the same scan during which the need for an incrementing or decrementing was determined to be necessary. The incrementing or decrementing may, for example, be made at the end of the scan or at the beginning of the next scan. Similarly, the flags may be arranged so that a setting of the "too bright" flag is automatically accompanied by a resetting of the "too dark" flag, and vice-versa. Such a variant may be advantageous in applications in which it is possible for both flags to become set without the illumination signal re-entering window W. The flags may also be arranged so that both are reset at the end of each scan, thereby allowing each scan to make an exposure acceptability determination which is independent of the results of any prior determination. It will be understood that all such variants and their equivalents are within the contemplation of the present invention.

Figures 2A, 2B:
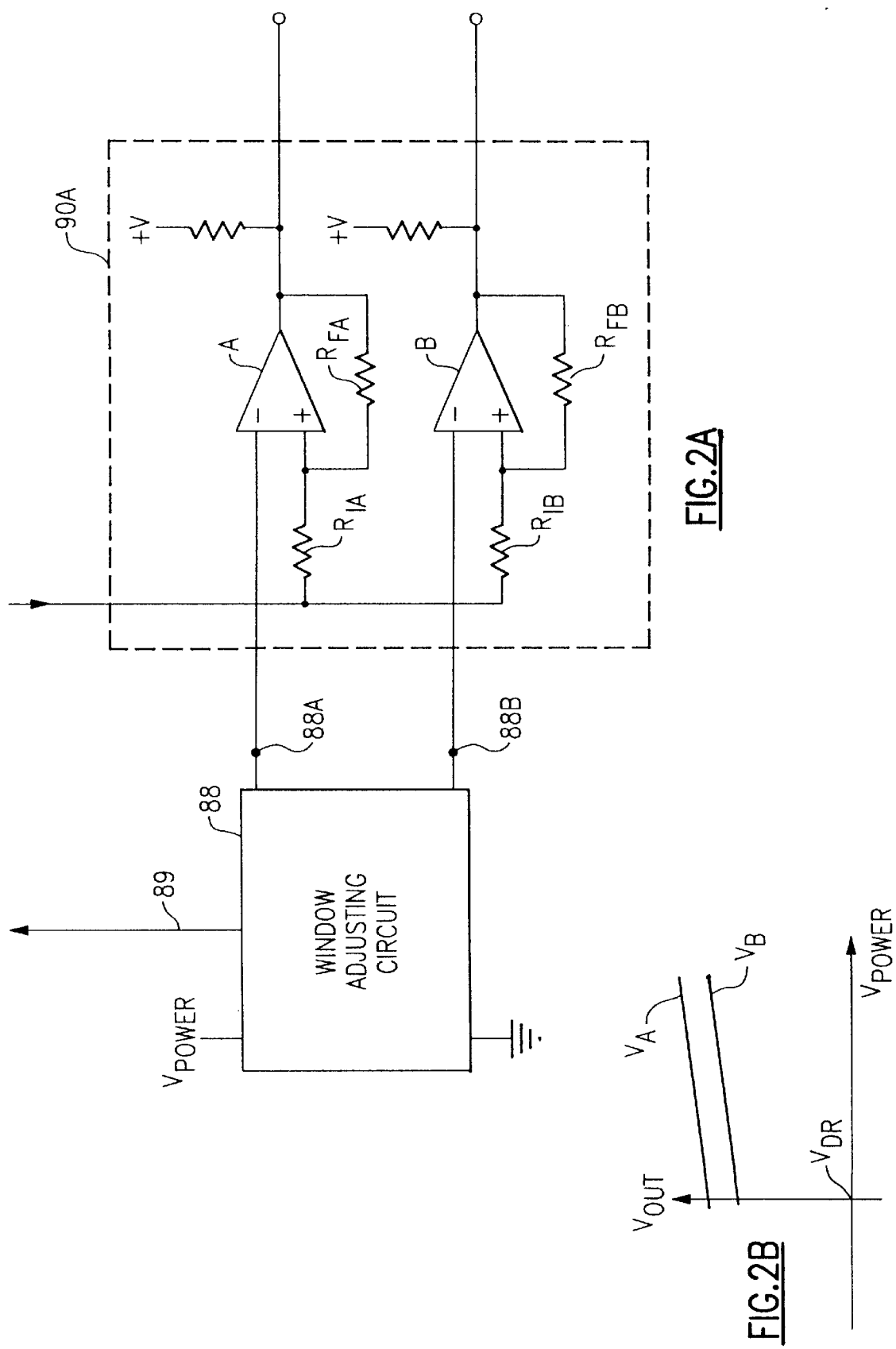
FIG. 2A is a block-schematic circuit of a window detector circuit suitable for use in the reader of FIG. 1A.
FIG. 2B shows the output voltages of the window adjusting circuit of FIG. 2A.

Referring to FIGS. 1A and 2A there is shown a variant of the exposure control circuitry of the invention which allows the boundaries of the illumination window to be automatically adjusted in accordance with variations in the voltage at which the image sensor operates. Adjustments of these boundaries are desirable because variations in the magnitude of the image sensor supply voltage affect the dark reference voltage of the image sensor, which in turn affects the magnitude of the illumination signal. By making the boundaries of the illumination signal increase and decrease by approximately the same amount as the illumination signal, the relationship between the illumination signal and the illumination window is maintained. This, in turn, assures that determinations of whether the exposure time of the image sensor is or is not within acceptable limits are unaffected by variations in the reader's power supply voltages, and thereby prevents changes in exposure time that are not associated with changes in the illumination level at the target.

The above-described result is produced by including in the exposure control circuitry a window adjusting circuit 88 and by replacing the window detector 90 of FIG. 2 by a window detector 90A of the type shown in FIG. 2A. As shown in FIG. 2A, window detector 90A is generally similar to that of window detector 90 of FIG. 2, except that the passive voltage dividers thereof are eliminated and replaced by connections to the outputs 88A and 88B of window adjusting circuit 88. The latter circuit preferably includes a pair of operational amplifier circuits (not shown) which have output voltages that are predetermined linear functions of the voltage $V_{POWER}$ produced by the image sensor power supply, as shown in FIG. 2B. The parameters of these linear functions, i.e., their slopes and intercepts, depend on the type of image sensor and power supply that is used, and are selected to cause the voltages applied to comparators A and B to vary just enough to track the variations in the illumination signal that are caused by changes in $V_{POWER}$. The latter voltages are referenced to a dark reference voltage $V_{DR}$ which is adjusted to a value proper for each particular image sensor under a condition of known zero input at the time of manufacture. This dark reference voltage is also applied to white peak tracking circuit 86, via a conductor 89, thereby assuring that the latter circuit and the window detector circuit are referenced to the same voltage. Because operational amplifier circuits that produce output voltages that are linear functions of their input voltages are known to those skilled in the art, these operational amplifier circuits will not be discussed in detail herein.

Because the earlier discussed differences between the exit and re-entry threshholds of the illumination window are produced by feedback resistances $R_{FA}$ and $R_{FB}$ and input resistances $R_{IA}$ and $R_{IB}$, changes in the boundaries of the illumination window that are made by window adjusting circuit 88 automatically result in changes in both the exit and re-entry threshholds of the window. As a result, it is not necessary to provide separate adjusting circuits for each of these switching threshholds. It will be understood that, if the window exit and re-entry thresholds are produced by separate threshhold setting circuits, it may be desirable to use a voltage adjusting circuit that simultaneously adjusts all four of these thresholds.

While the foregoing description makes reference to a number of specific embodiments, it will be understood that the true spirit and scope of the present invention should be determined with reference to the appended claims.

What is claimed is:

1. An apparatus for optically scanning encoded data from an optically readable indicia and converting said data into an electrical signal that may be decoded to recover said data, said apparatus being of the type which continues scanning, without substantial interruption, until scanning is discontinued, including, in combination:
   a) an image sensor, having a pixel array that includes a plurality of pixels, for receiving an image of said indicia and for generating an image sensor signal that varies in accordance with the intensity of light incident on said pixel array and the exposure time of said sensor, said image sensor having an exposure time that can be varied over a dynamic range;
   b) illumination signal generating means responsive to said image sensor signal for generating an illumination signal that varies in accordance with said image sensor signal;
   c) exposure control means for controlling the exposure time of said image sensor, including:
      (i) means for storing, at a plurality of sequentially selectable storage locations, a plurality of exposure control values that correspond to different respective exposure times for said image sensor, said exposure control values being selected to make available, for exposure control purposes, approximately all of said dynamic range;
      (ii) means for establishing a pointer for identifying the storage location that stores the exposure control value to be used during each scan;
      (iii) adjusting means for advancing said pointer in a first direction if said illumination signal is greater than a maximum illumination value during a predetermined portion of a scan, and for advancing said pointer in a second, opposite direction if said illumination signal is less than a minimum illumination value during said predetermined portion of a scan;
   whereby the magnitude of said illumination signal changes in a stepwise manner until it remains between said maximum and minimum illumination values.

2. The apparatus of claim 1 in which said advancing causes said exposure control value to change from a value that corresponds to one segment of said dynamic range to a value that corresponds to an immediately adjacent segment of said dynamic range.

3. The apparatus of claim 1 in which said maximum illumination value includes first and second component maximum illumination values, said first component maximum illumination value being associated with a determination that an illumination signal is too large, and said second component maximum illumination signal being associated with a determination that said illumination signal is not too large.

4. The apparatus of claim 1 in which said minimum illumination value includes first and second component minimum illumination values, said first component minimum illumination value being associated with a determination that an illumination signal is too small, and said second component minimum illumination signal being associated with a determination that said illumination signal is not too small.

5. The apparatus of claim 3 in which said minimum illumination value includes first and second component minimum illumination values, said first component minimum illumination value being associated with a determination that an illumination signal is too small, and said second component minimum illumination signal being associated with a determination that said illumination signal is not too small.

6. The apparatus of claim 1 in which changes in said pointer are made, if at all, once each time that said illumination signal does not remain between said maximum and minimum illumination values during said predetermined portion of a scan.

7. The apparatus of claim 1 in which said illumination signal varies approximately in accordance with the instantaneous value of said image sensor signal, and in which said predetermined portion of a scan approximates a single time during that scan.

8. The apparatus of claim 1 in which said illumination signal varies in accordance with a time averaged value of said image sensor signal.

9. An apparatus for optically scanning encoded data from an optically readable indicia and converting said data into an electrical signal that may be decoded to recover said data, said apparatus being of the type which scans, without substantial interruption, until scanning is discontinued, including, in combination:
   a) an image sensor, having a pixel array that includes a plurality of pixels, for receiving an image of said indicia and for generating an image sensor signal that varies in accordance with the intensity of light incident on said pixel array and the exposure time of said sensor, said exposure time comprising a controllable fraction of a scan period of said image sensor, the range of possible durations for said exposure time defining the dynamic range of said image sensor;
   b) an illumination signal generator for generating an illumination signal that varies in accordance with said image sensor signal;
   c) exposure control circuitry for controlling the exposure time of said image sensor, including:
      (i) means for storing, at a plurality of storage locations, a plurality of different respective exposure times for said scans, each exposure time being associated with a predetermined respective subdivision of said dynamic range;
      (ii) means for identifying, for each scan, the storage location containing the exposure time for that scan;
      (iii) adjusting means for directing said identifying means to identify a storage location that stores the next lower exposure time subdivision of said dynamic range if said illumination signal is greater than a maximum illumination value during a predetermined portion of a scan, and for directing said identifying means to identify a storage location that stores the next higher exposure time subdivision of said dynamic range if said illumination signal is less than a minimum illumination value during said predetermined portion of a scan;
   whereby said illumination signal is made to progressively take on a value which is within an illumination window having boundaries defined by said maximum and minimum illumination values.

10. The apparatus of claim 9 in which said directing means causes said exposure time to change from a value that corresponds to one subdivision of said dynamic range to a value that corresponds to an immediately adjacent subdivision of said dynamic range.

11. The apparatus of claim 9 in which said window has at least one boundary that includes first and second switching thresholds, and in which a predetermined hysteresis exists between the first and second switching thresholds at said at least one boundary.

12. The apparatus of claim 9 in which each boundary of said window includes first and second switching thresholds, and in which a predetermined hysteresis exists between the first and second switching thresholds at each boundary of said window.

13. The apparatus of claim 9 in which said directing takes place, if at all, once each time that said illumination signal does not remain between said maximum and minimum illumination values during said predetermined portion of a scan.

14. The apparatus of claim 9 in which said illumination signal varies approximately in accordance with the instantaneous value of said image sensor signal, and in which said predetermined portion of a scan approximates a single time during that scan.

15. The apparatus of claim 9 in which said illumination signal varies in accordance with a time averaged value of said image sensor signal.

16. An apparatus for optically scanning encoded data from an optically readable indicia and converting said data into an electrical signal that may be decoded to recover said data, said apparatus being of the type which continues scanning, without substantial interruption, until scanning is discontinued, including, in combination:
   a) an image sensor, having a pixel array that includes a plurality of pixels, for receiving an image of said indicia and for generating an image sensor signal that varies in accordance with the intensity of light incident on said pixel array and the exposure time of said sensor, said image sensor having an exposure time that can be varied over a dynamic range;
   b) illumination signal generating means responsive to said image sensor signal for generating an illumination signal that varies in accordance with said image sensor signal;
   c) exposure control means for controlling the exposure time of said image sensor, including:
      (i) means for storing, at a plurality of sequentially selectable storage locations, a plurality of exposure control values that correspond to different respective exposure times for said image sensor, said exposure control values being selected to make available, for exposure control purposes, approximately all of said dynamic range;
      (ii) a pointer for identifying the storage location that stores the exposure control value to be used during each scan;
      (iii) means for establishing a window having upper and lower window exit thresholds defined by first maximum and minimum illumination values, respectively, and having upper and lower window re-entry thresholds defined by second maximum and minimum illumination values, respectively; and
      (iv) adjusting means for changing said pointer if said illumination signal is not between said upper and lower exit thresholds during a predetermined portion of a scan, and for not changing said pointer if said illumination signal is between said upper and lower re-entry thresholds during a predetermined portion of a scan;
   whereby the magnitude of said illumination signal changes in a stepwise manner until it remains between said upper and lower re-entry thresholds.

17. The apparatus of claim 16 in which changes in said pointer cause said exposure control value to change from a value that corresponds to one segment of said dynamic range to a value that corresponds to an immediately adjacent segment of said dynamic range.

18. The apparatus of claim 16 in which changes in said pointer are made, if at all, once each time that said illumination signal is not between said window exit thresholds during said predetermined portion of a scan.

19. The apparatus of claim 16 in which said illumination signal varies approximately in accordance with the instantaneous value of said image sensor signal, and in which said predetermined portion of a scan approximates a single time during that scan.

20. The apparatus of claim 16 in which said illumination signal varies in accordance with a time averaged value of said image sensor signal.

21. An apparatus for optically scanning encoded data from an optically readable indicia and converting said data into an electrical signal that may be decoded to recover said data, said apparatus being of the type which continues scanning, without substantial interruption, until scanning is discontinued, including, in combination:
   a) an image sensor, having a pixel array that includes a plurality of pixels, for receiving an image of said indicia and for generating an image sensor signal that varies in accordance with the intensity of light incident on said pixel array and the exposure time of said sensor, said image sensor having an exposure time that can be varied over a dynamic range;
   b) illumination signal generating means responsive to said image sensor signal for generating an illumination signal that varies in accordance with said image sensor signal;
   c) exposure control means for controlling the exposure time of said image sensor, including:
      (i) means for storing at a plurality of selectable storage locations a plurality of exposure control values that correspond to different respective exposure times for said image sensor, said exposure control values being selected to make available, for exposure control purposes, approximately all of said dynamic range;
      (ii) adjusting means for selecting a storage location having an exposure time shorter than the last selected exposure time if said illumination signal is greater than a maximum illumination value during a predetermined portion of a scan, and for selecting a storage location having an exposure time longer than the last selected exposure time if said illumination signal is less than a minimum illumination value during said predetermined portion of a scan, said maximum and minimum illumination values together defining a window of acceptability; and
   d) window adjusting means for adjusting said maximum and minimum illumination values in accordance with variations in the operating voltage of said image sensor;
   whereby the magnitude of said illumination signal changes in a stepwise manner until it remains between said maximum and minimum illumination values.

22. The apparatus of claim 21 in which said exposure control means further includes window detecting means for indicating whether said illumination signal is within said window.

23. The apparatus of claim 22 in which said window adjusting means includes a window adjusting circuit for generating first and second output voltages each of which varies as an approximately linear function of the operating voltage of said image sensor, and means for connecting said window adjusting circuit to said window detecting means.

24. An apparatus for optically scanning encoded data from an optically readable indicia and converting said data into an electrical signal that may be decoded to recover said data, said apparatus being of the type which continues scanning, without substantial interruption, until scanning is discontinued, including, in combination:

an image sensor, having a pixel array that includes a plurality of pixels, for receiving an image of said indicia and for generating an image sensor signal that varies in accordance with the intensity of light incident on said pixel array and the exposure time of said sensor, said image sensor having an exposure time that can be varied over a dynamic range;

an illumination signal generating or responsive to said image sensor signal for generating an illumination signal that varies in accordance with said image sensor signal;

an exposure controller comprising a plurality of sequentially selectable storage locations storing a plurality of exposure control values that correspond to different respective exposure times for said image sensor, said exposure control values being selected to make available, for exposure control purposes, approximately all of said dynamic range wherein said exposure controller establishes a pointer for identifying the storage location that stores the exposure control value to be used during each scan, said exposure control being adapted to advance said pointer in a first direction if said illumination signal is greater than a maximum illumination value during a predetermined portion of a scan, and to advance said pointer in a second, opposite direction if said illumination signal is less than a minimum illumination value during said predetermined portion of a scan, whereby the magnitude of said illumination signal changes in a stepwise manner until it remains between said maximum and minimum illumination values.

25. The apparatus of claim 24, in which said advancing causes said exposure control value to change from a value that corresponds to one segment of said dynamic range to a value that corresponds to an immediately adjacent segment of said dynamic range.

26. The apparatus of claim 24, in which said maximum illumination value includes first and second component maximum illumination values, said first component maximum illumination value being associated with a determination that an illumination signal is too large, and said second component maximum illumination signal being associated with a determination that said illumination signal is not too large.

27. The apparatus of claim 24, in which said minimum illumination value includes first and second component minimum illumination values, said first component minimum illumination value being associated with a determination that an illumination signal is too small, and said second component minimum illumination signal being associated with a determination that said illumination signal is not too small.

28. The apparatus of claim 26, in which said minimum illumination value includes first and second component minimum illumination values, said first component minimum illumination value being associated with a determination that an illumination signal is too small, and said second component minimum illumination signal being associated with a determination that said illumination signal is not too small.

29. The apparatus of claim 24, in which changes in said pointer are made, if at all, once each time that said illumination signal does not remain between said maximum and minimum illumination values during said predetermined portion of a scan.

30. The apparatus of claim 24, in which said illumination signal varies approximately in accordance with the instantaneous value of said image sensor signal, and in which said predetermined portion of a scan approximates a single time during that scan.

31. The apparatus of claim 24, in which said illumination signal varies in accordance with a time averaged value of said image sensor signal.

* * * * *